United States Patent Office 2,698,861
Patented Jan. 4, 1955

2,698,861

METHOD OF PREPARING ALKOXYSILICON COMPOUNDS

Leonard M. Shorr, Pittsburgh, Pa., assignor to Dow Corning Corporation, Midland, Mich., a corporation of Michigan No Drawing. Application August 5, 1953,
Serial No. 372,607

6 Claims. (Cl. 260—448.8)

This application relates to a method of preparing alkoxysilicon compounds by reacting orthoformates with halosilicon compounds.

The preparation of alkoxysilanes is generally carried out by reacting halosilanes with alcohols. This method produces at best about a 50% yield of the desired alkoxysilanes. The low yield is due to rearrangements and side reactions which are caused by the HX formed during the reaction. The yield of alkoxysilanes containing silicon-bonded hydrogen is even less than 50% when prepared on a commercial scale by this direct process and the yield is no more than 50% even when the most careful conditions are maintained such as those described by Havill, Joffe and Post, Journal of Organic Chemistry, volume 13, page 280 (1948).

Another method which has been employed to prepare alkoxysilanes involves the reaction of an organoalkoxysilane and a halosilane in the presence of traces of hydrohalide acids. This is an interchange reaction and produces in general superior yields of alkoxysilanes to those obtained by the above direct process. However, this reaction necessitates the preparation of an alkoxysilane as one of the starting materials. Thus, the interchange reaction does not avoid the necessity of reacting halosilanes directly with alcohols. Consequently from a commercial standpoint there is little to be gained by employing the interchange reaction.

It is the object of this invention to provide a method of preparing in good yields alkoxysilicon compounds directly from halosilicon compounds. Another object is to provide a superior method for preparing alkoxysilanes containing silicon bonded hydrogen. Other objects and advantages will be apparent from the following description.

In accordance with this invention halosilicon compounds of the formula $R_aH_bSiX_{4-(a+b)}$ and partial hydrolyzates thereof, where R is a monovalent hydrocarbon radical, $a$ has a value from 0 to 3, $b$ has a value from 0 to 3, the sum of $a+b$ being not greater than 3 and X is a halogen having an atomic weight less than 100, are reacted with an orthoformate of the formula $HC(OR')_3$, where R' is methyl or ethyl.

When the halosilicon compound and the orthoformate are mixed, reaction occurs spontaneously with the formation of an alkoxysilicon compound. The by-products of the reaction are an alkylhalide and a formic acid ester. Thus, the reaction may be represented schematically by the equation $$\equiv SiX + HC(OR')_3 \rightarrow \equiv SiOR' + R'X + HCOOR'$$

In many cases the rate of reaction between the halosilicon compound and the orthoformate is such that it is desirable to cool the reaction mixture. In other cases, particularly where fluorosilicon compounds are employed, it is best to heat the mixture to 80 to 100° C. in order to hasten the reaction and to drive it to completion.

In carrying out the reaction of this invention it is sometimes advantageous to employ catalyst such as aluminum chloride. The use of catalyst is particularly advantageous when the silicon compound is a fluorosilicon compound. The catalyst is best employed in amounts less than 1% by weight of the combined weight of the reactants.

Halosilanes which are operative in this invention include both hydrocarbon substituted halosilanes and unsubstituted halosilanes. For the purposes of this invention any monovalent hydrocarbon radical may be attached to the silicon atom. Specific examples of halosilanes which are operative in this invention are silicon tetrahalides such as silicon tetrachloride, silicon tetrabromide or dichlorodifluorosilane; hydrogen-containing silanes such as trichlorosilane, trifluorosilane, dichlorosilane and monochlorosilane and hydrocarbon substituted halosilanes such as methyltrichlorosilane, octadecylmethyldichlorosilane, phenylvinyldibromosilane, cyclohexyldichlorosilane, methylmonochlorosilane ($MeH_2SiCl$), triphenylchlorosilane, tolylcyclohexenyldifluorosilane and xenyltribromosilane.

In addition to halosilanes this invention includes within its scope partial hydrolyzates of the above halosilanes namely halosiloxanes. These halosiloxanes are polymeric materials in which the silicon atoms are linked through oxygen atoms and at least some of the silicon atoms have the defined halogen atoms linked thereto. Any remaining valences of the silicon atoms are satisfied by monovalent hydrocarbon radicals and/or hydrogen atoms. Specific examples of partial hydrolyzates which are operative in this invention are hexachlorodisiloxane, dimethyltetrafluorodisiloxane, $Cl_3SiOSiCl_2OSiCl_3$

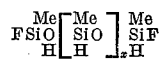

and

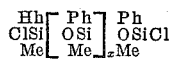

It is to be understood that the halosilicon compound employed in the reaction can be mixtures of any combination of halosilanes or any combination of halosiloxanes or any combination of halosilanes and halosiloxanes.

The orthoformates which are employed in this invention are methylorthoformate and ethylorthoformate or combinations thereof.

The alkoxysilanes which are produced by the method of this invention are useful in the preparation of polysiloxanes and in hydrophobing applications. The hydrogen-containing alkoxysilanes are particularly adaptable for hydrophobing materials under those conditions where a volatile noncorrosive hydrophobing agent is needed, for example, in applications in which it is desired to pass a vapor over the material which is to be hydrophobed.

The following examples are illustrative only and should not be construed as limiting the invention which is properly delineated in the appended claims.

*Example 1*

129 g. of dimethyldichlorosilane and 163 g. of ethylorthoformate were mixed. Reaction began at once and the mixture was cooled until the reaction had subsided. The mixture was then refluxed overnight and then distilled to give a 43.4 mol per cent yield of dimethylchloroethoxysilane, a 34.3 mol per cent yield of dimethyldiethoxysilane and an 8.8 mol per cent yield of tetramethyldiethoxydisiloxane together with a 5 mol per cent yield of higher siloxanes. The presence of the siloxane products was due to the contamination of the orthoformate with alcohol and water.

*Example 2*

57.5 g. of methyldichlorosilane was added to 148 g. of freshly distilled ethylorthoformate. Reaction began at once with the evolution of ethylchloride. The mixture was cooled to keep the temperature below 46° C. After ½ hour the mixture was distilled and an 82 mol per cent yield of methyldiethoxysilane was obtained.

*Example 3*

52.5 g. of phenyltrifluorosilane was heated with 218 g. of freshly distilled ethylorthoformate in the presence of a catalytic quantity of aluminum chloride for approximately 30 hours. Upon distillation, a 39.6 mol per cent yield of phenylfluorodiethoxysilane and a 57.5 mol per cent yield of phenyltriethoxysilane were obtained.

*Example 4*

When 1 mol of octadecylvinyldichlorosilane is reacted with 2 mols of methylorthoformate in the manner of Example 1 octadecylvinyldimethoxysilane is obtained.

Example 5

When 1 mol of trichlorosilane is reacted with 3 mols of ethylorthoformate in the manner of Example 1 triethoxysilane is obtained.

Example 6

When 1 mol of phenylmethyldichlorosilane is reacted with 2 mols of ethylorthoformate in the manner of Example 1 phenylmethyldiethoxysilane is obtained.

Example 7

When 1 mol of hexachlorodisiloxane is reacted with 6 mols of ethylorthoformate in the manner of Example 1 hexaethoxydisiloxane is obtained.

That which is claimed is:

1. A method of preparing alkoxysilicon compounds which comprises reacting a halosilicon compound selected from the group consisting of halosilanes of the formula $R_aH_bSiX_{4-(a+b)}$ and partial hydrolyzates thereof, where R is a monovalent hydrocarbon radical, $a$ has a value from 0 to 3 inclusive, $b$ has a value from 0 to 3 inclusive, the sum of $a+b$ being not greater than 3 and X is a halogen having an atomic weight less than 100, with an orthoformate of the formula $HC(OR')_3$ where $R'$ is selected from the group consisting of ethyl and methyl radicals.

2. The method in accordance with claim 1 wherein the halosilane is dimethyldichlorosilane.

3. A method in accordance with claim 1 wherein the halosilane is methyldichlorosilane.

4. The method in accordance with claim 1 wherein the halosilane is a phenyltrihalosilane.

5. The method in accordance with claim 1 wherein the halosilane is phenylmethyldichlorosilane.

6. The method in accordance with claim 1 wherein the halosilane is trichlorosilane.

No references cited.